(12) United States Patent
Carlson et al.

(10) Patent No.: US 9,638,565 B2
(45) Date of Patent: May 2, 2017

(54) MAGNETIC LEVEL GAUGE INDICATOR WITH ULTRA-WIDE VIEWING ANGLE

(71) Applicant: SOR Inc., Lenexa, KS (US)

(72) Inventors: Russell Carlson, Baldwin City, KS (US); Sara Roos, Overland Park, KS (US)

(73) Assignee: SOR INC., Lenexa, KS (US)

(*) Notice: Subject to any disclaimer, the term of this patent is extended or adjusted under 35 U.S.C. 154(b) by 145 days.

(21) Appl. No.: 14/638,990

(22) Filed: Mar. 4, 2015

(65) Prior Publication Data

US 2015/0253179 A1   Sep. 10, 2015

Related U.S. Application Data

(60) Provisional application No. 61/947,901, filed on Mar. 4, 2014.

(51) Int. Cl.
| | | |
|---|---|---|
| *G01F 23/62* | (2006.01) | |
| *G01F 23/00* | (2006.01) | |
| *G01F 23/72* | (2006.01) | |
| *G01F 23/74* | (2006.01) | |
| G01F 23/02 | (2006.01) | |
| G01F 23/38 | (2006.01) | |
| G01F 23/66 | (2006.01) | |

(52) U.S. Cl.
CPC .......... *G01F 23/0046* (2013.01); *G01F 23/72* (2013.01); *G01F 23/74* (2013.01); *G01F 23/02* (2013.01); *G01F 23/38* (2013.01); *G01F 23/66* (2013.01)

(58) Field of Classification Search
CPC .......... G01F 23/72; G01F 23/62; G01F 23/74; G01F 23/0046; G01F 23/02; G01F 23/66; G01F 23/38
USPC ................ 116/204, 109–111, 227–229, 267, 116/272–273, 276; 73/305, 319, 323, 73/DIG. 5, 314
See application file for complete search history.

(56) References Cited

U.S. PATENT DOCUMENTS

| | | | | |
|---|---|---|---|---|
| 763,300 | A * | 6/1904 | Whitney | ................. G01F 23/02 73/326 |
| 809,471 | A * | 1/1906 | Seabury | .................. G01F 23/02 116/276 |
| 1,132,372 | A * | 3/1915 | Mears | ..................... G01F 23/02 73/326 |
| 2,620,663 | A * | 12/1952 | Fine | ...................... F25B 41/006 220/2.3 R |

(Continued)

Primary Examiner — R. A. Smith
Assistant Examiner — Tania Courson
(74) Attorney, Agent, or Firm — Spencer Fane LLP (57) ABSTRACT

A level gauge for determining the level of a liquid in a vessel includes lenticular lens assembly allowing a plurality of level indicator flags enclosed therein to be viewed from a wide angle. The indicator flags have an elongated body manufactured from a sheet of material, and form a central pocket for retaining a magnet, and pins on either end for mounting within a frame. A mounting frame positions the lens assembly whereby an open channel is formed between the lens assembly and a back plate. The mounting frame is mounted to the vessel using spacers forming an open gap between the mounting frame and vessel. The open channel and gap minimize the transfer of heat from the vessel to the level gauge. The passage of a float with a magnet on the liquid in the vessel rotates the flags.

16 Claims, 8 Drawing Sheets

(56) References Cited

U.S. PATENT DOCUMENTS

| | | | | |
|---|---|---|---|---|
| 2,706,463 A * | 4/1955 | Dunn | G01L 19/12 | 116/272 |
| 2,707,396 A * | 5/1955 | Dupure | G01F 23/02 | 116/276 |
| 2,934,953 A * | 5/1960 | Anderson | G01F 23/66 | 73/319 |
| 3,377,537 A * | 4/1968 | Brailsford | G01F 23/70 | 318/444 |
| 3,837,226 A * | 9/1974 | Kawawa | B01J 3/004 | 220/663 |
| 3,964,312 A * | 6/1976 | Sebek | G01F 23/66 | 73/307 |
| 4,050,305 A * | 9/1977 | Evans | G01F 1/22 | 73/272 R |
| 4,194,397 A * | 3/1980 | Yasuda | G01F 23/66 | 73/314 |
| 4,345,468 A * | 8/1982 | Jackson | G01F 23/02 | 62/85 |
| 4,457,171 A * | 7/1984 | Gebauer | G01F 23/72 | 73/305 |
| 4,512,190 A * | 4/1985 | Sledmere | G01F 23/72 | 335/302 |
| 4,809,862 A * | 3/1989 | Canty | G02B 7/007 | 116/276 |
| 5,323,653 A * | 6/1994 | Gruett | G01K 13/02 | 374/E13.006 |
| 5,373,746 A * | 12/1994 | Bloss | G01F 1/22 | 248/222.12 |
| 5,383,338 A * | 1/1995 | Bowsky | F25B 41/006 | 116/206 |
| 5,471,881 A | 12/1995 | Hochstein | | |
| 5,986,449 A * | 11/1999 | Koski | G01F 23/2963 | 324/207.13 |
| 5,988,701 A * | 11/1999 | Wu | G01F 23/74 | 285/197 |
| 5,998,991 A * | 12/1999 | Begin | G01F 23/443 | 324/207.13 |
| 6,234,018 B1 * | 5/2001 | Kelada | F16K 17/26 | 73/323 |
| 6,435,026 B1 * | 8/2002 | Donehue | G01F 23/74 | 73/314 |
| 6,532,815 B2 * | 3/2003 | Wech | G01F 23/02 | 73/323 |
| 6,571,626 B1 * | 6/2003 | Herford | G01F 23/74 | 73/290 R |
| 6,588,272 B2 * | 7/2003 | Mulrooney | G01F 23/263 | 116/204 |
| 8,662,003 B1 * | 3/2014 | Cooper | B65H 63/08 | 116/200 |
| 2006/0254368 A1 * | 11/2006 | Kawashima | G01F 1/28 | 73/861.57 |
| 2008/0098809 A1 * | 5/2008 | Skinner | G01F 23/2963 | 73/290 R |
| 2011/0005312 A1 * | 1/2011 | Hopper | G01F 23/0046 | 73/313 |
| 2011/0088485 A1 * | 4/2011 | Bluemner | G01F 23/64 | 73/861.57 |
| 2012/0324996 A1 * | 12/2012 | Taylor | G01F 23/02 | 73/313 |

* cited by examiner

MAGNETIC LEVEL GAUGE INDICATOR WITH ULTRA-WIDE VIEWING ANGLE

CROSS-REFERENCE TO RELATED APPLICATIONS

This application claims the benefit of U.S. Provisional Application No. 61/947,901, filed Mar. 4, 2014, the contents of which are hereby incorporated by reference.

BACKGROUND

A magnetic level gauge consists of a pressure tight chamber containing a float with a magnet inside. A visual indicator assembly is attached to the outside of the chamber, consisting of a series of flags or flippers rotatable 180 degrees. Each flipper contains a magnet which interacts with the float magnet to rotate 180 degrees as the float moves past the flipper in the chamber. The flipper rotates in one direction as the float moves past the flipper in a vertical direction, and back to its original position as the float moves in the opposite direction. The flippers each have contrasting colors on opposite sides, so they create a solid visual bar of color, one color below the current location of the float and the other color above the current location of the float.

The chamber is connected to a liquid process. The float has sufficient buoyancy to ride on the surface of the liquid as it moves up and down. The interaction between the float magnet and the flipper magnets, rotating the flippers as the float moves past as previously described, allows an external visual indication of the level of process liquid inside the chamber without exposing that liquid to the outside atmosphere or requiring direct visual sight of the process liquid.

SUMMARY

A level gauge for determining the level of a liquid in a vessel fluidly connected to a process chamber includes a lens assembly with a lenticular lens for viewing the indicator flags enclosed therein from a wide viewing angle. The position of the flags within the lens, in conjunction with the location and orientation of the lenticular lens allows the flags to be viewed at an angle between directly in front to about 110 degrees on either side of the face of the lens.

The indicator flags are formed from a monolithic piece of material. The indicator flags extend from a first end to a second end, and form a central pocket for retaining a magnet that rotates within a frame as a float with a magnet riding on the surface of the liquid in the vessel passes behind the frame. The central pocket is formed from the body of the flag and includes a central crescent-shaped member and adjacent upper and lower crescent-shaped members. Tabs formed from the upper and lower crescent-shaped members are bent over the open ends of the pocket to retain the magnet therein. The flag first end and second end form pivot pins that are received within through openings in the indicator flag frame.

The lens assembly is mounted in a frame that is mounted to the vessel. The frame forms left and right channel members extending from a back plate, wherein the channel members form opposing grooves for positioning the lens assembly whereby a channel separates the lens assembly from the back plate. The back plate is separated from the vessel by spacers forming a gap therebetween. The channel separating the back plate from the lens assembly, and the back plate from the vessel allow air to circulate between the elements avoiding unnecessary heat gain that could affect performance of the components.

BRIEF DESCRIPTION OF THE DRAWINGS

The drawings constitute a part of this specification and include exemplary embodiments of the disclosed subject matter and illustrate various objects and features thereof.

DETAILED DESCRIPTION

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Referring to the drawings, FIGS. 1-8 show a magnetic level gage visual indicator assembly 100 with a wide viewing angle lens assembly 200 embodying principles of the disclosed subject matter. Various aspects and features of the disclosed subject matter include advantages, and provide technical benefits, that are an improvement over current devices. The visual indicator assembly 100 is used with a magnetic float 136 disposed within a vessel 134 connected to a process chamber 144 containing a fluid 142 for measuring the level of the fluid 142 in the process chamber 144.

Figure 1:
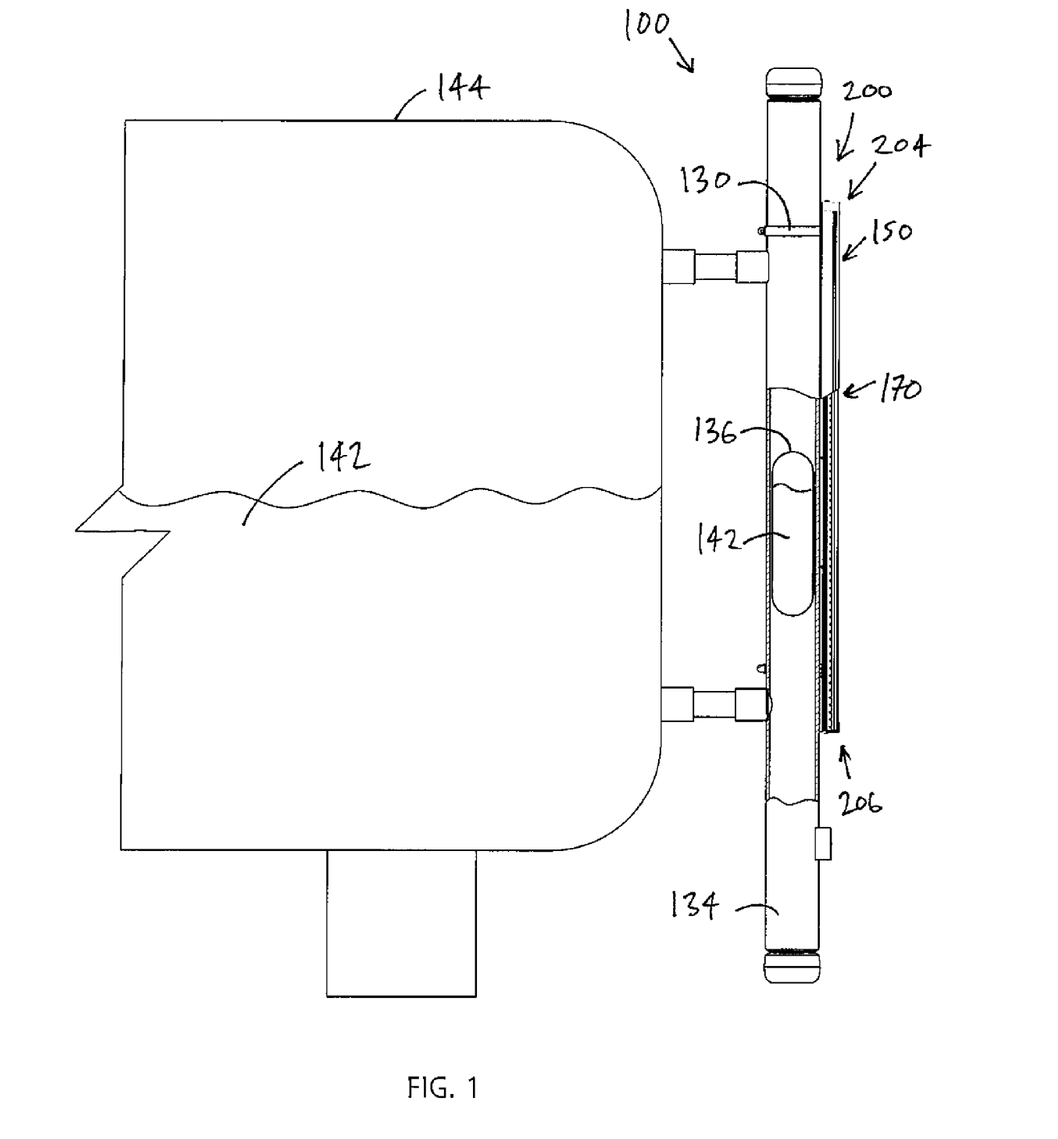
FIG. 1 is an elevation view of a visual indicator assembly embodying principles of the disclosed subject matter.
Figure 2:
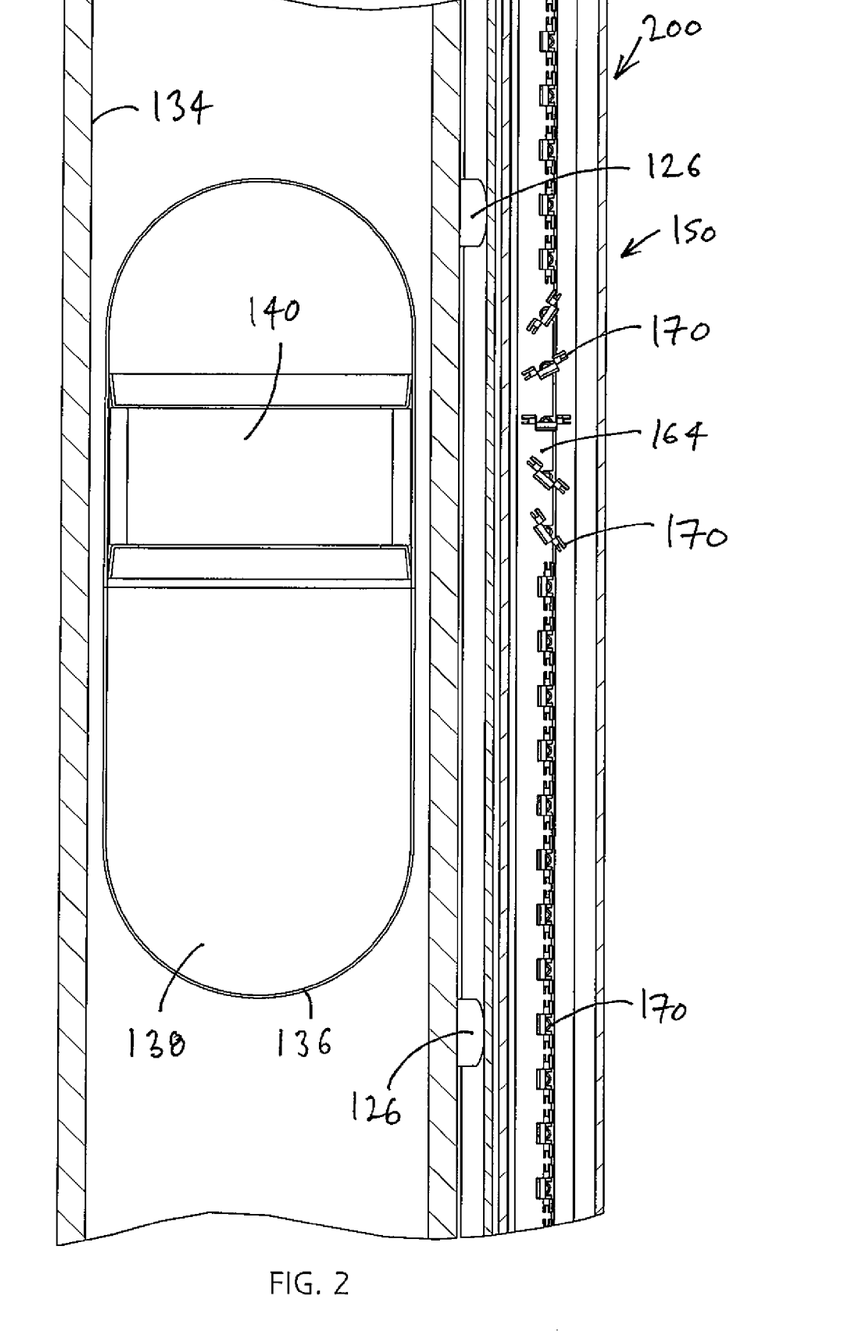
FIG. 2 is a cross sectional view of the visual indicator assembly of FIG. 1.

Referring to FIG. 1, the vessel 134 is generally installed upright, and is in fluid communication with the process chamber 144, accordingly, the level of the fluid 142 in the vessel 134 corresponds to the level of the fluid 142 in the process chamber 144. The magnetic float 136 includes a strong magnet 140 within a housing 138 that is partially submerged in the fluid 142 within the vessel 134. The float 136 moves up and down with the level of the fluid 142 within the vessel 134 in conjunction with the level of the fluid 142 within the process chamber 144. The vessel 134 is nonmagnetic allowing the float 136 to freely move within the vessel 134 along with the fluid 142. The visual indicator assembly 100 is attached to the vessel 134 and represents the level of the fluid 142 in the vessel 134 by the position of indicator flags 170 within a flag assembly 150.

The visual indicator assembly 100 includes a flag assembly 150 viewable with a lens assembly 200. The flag assembly 150 is disposed within the lens assembly 200, and the lens assembly 200 is connected to a frame 116 mounted to the vessel 134.

Figure 3:
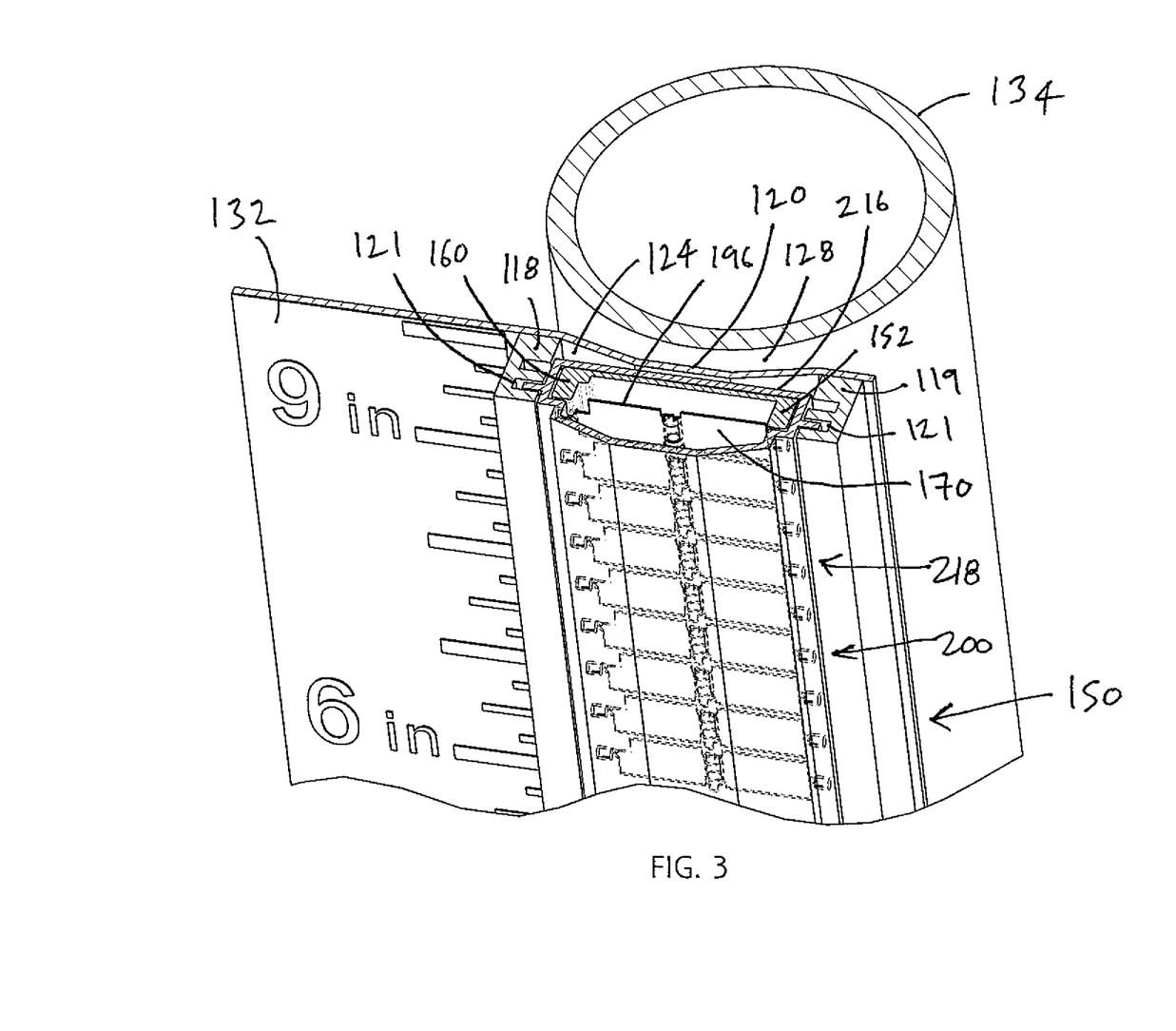
FIG. 3 is a perspective cross sectional view of the indicator assembly of FIG. 1.
Figure 4:
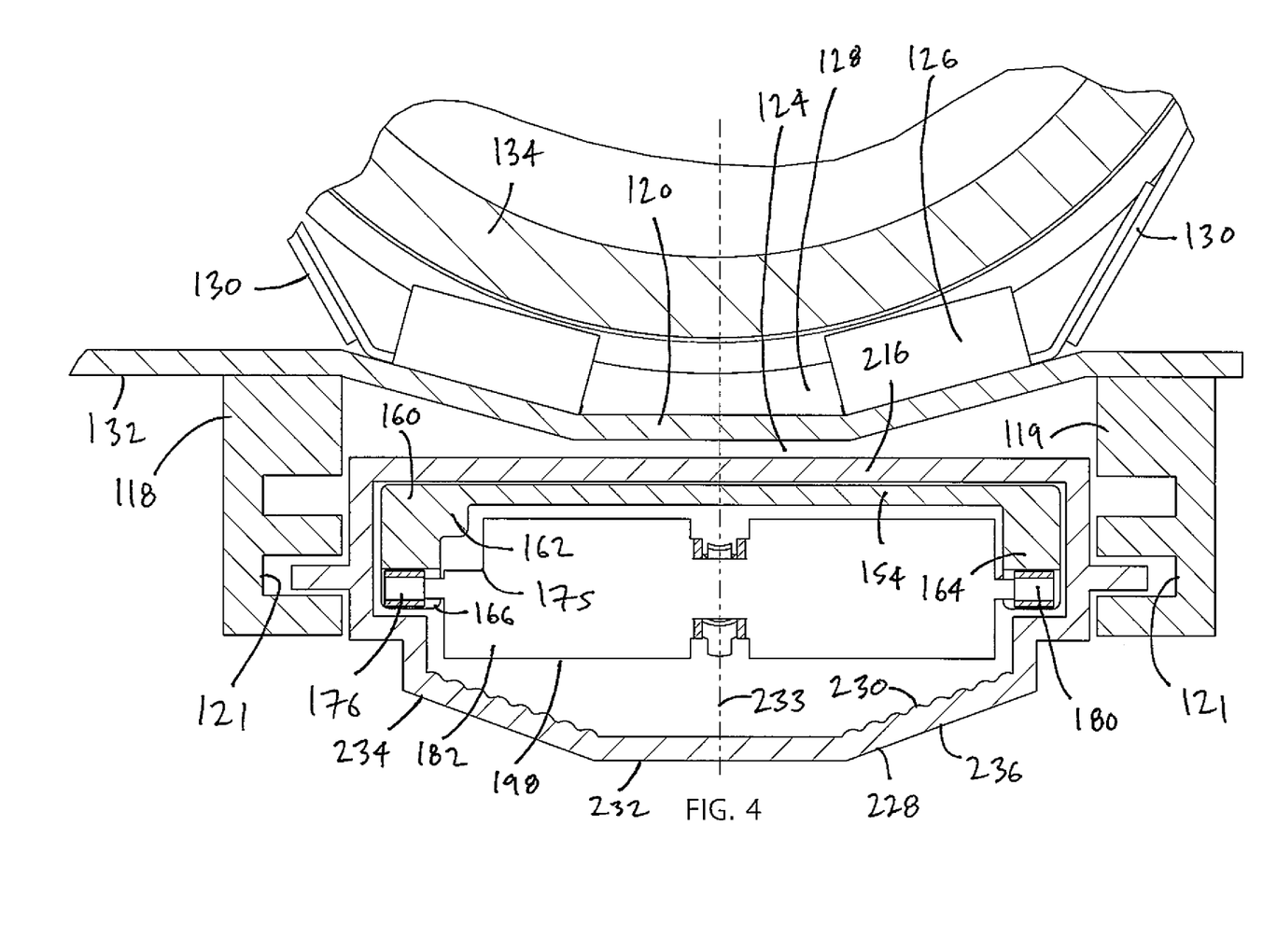
FIG. 4 is a top plan cross sectional view of the indicator assembly of FIG. 3.

Referring to FIGS. 3-4, the flag assembly 150 includes a frame 152 with a plurality of rotatable flags 170. The frame 152 is an elongated rectangular member extending between a top end and a bottom end, forming a rear portion 154 between opposing left and right sides 160, 164. The left and right sides 160, 164 include a series of opposing through openings or apertures 166 for receiving pins 176, 180, respectively of the flags 170. The left side 160 forms a stop 162 between the apertures 177 and the rear portion 154 limiting rotation of the flags 170.

Figure 6:
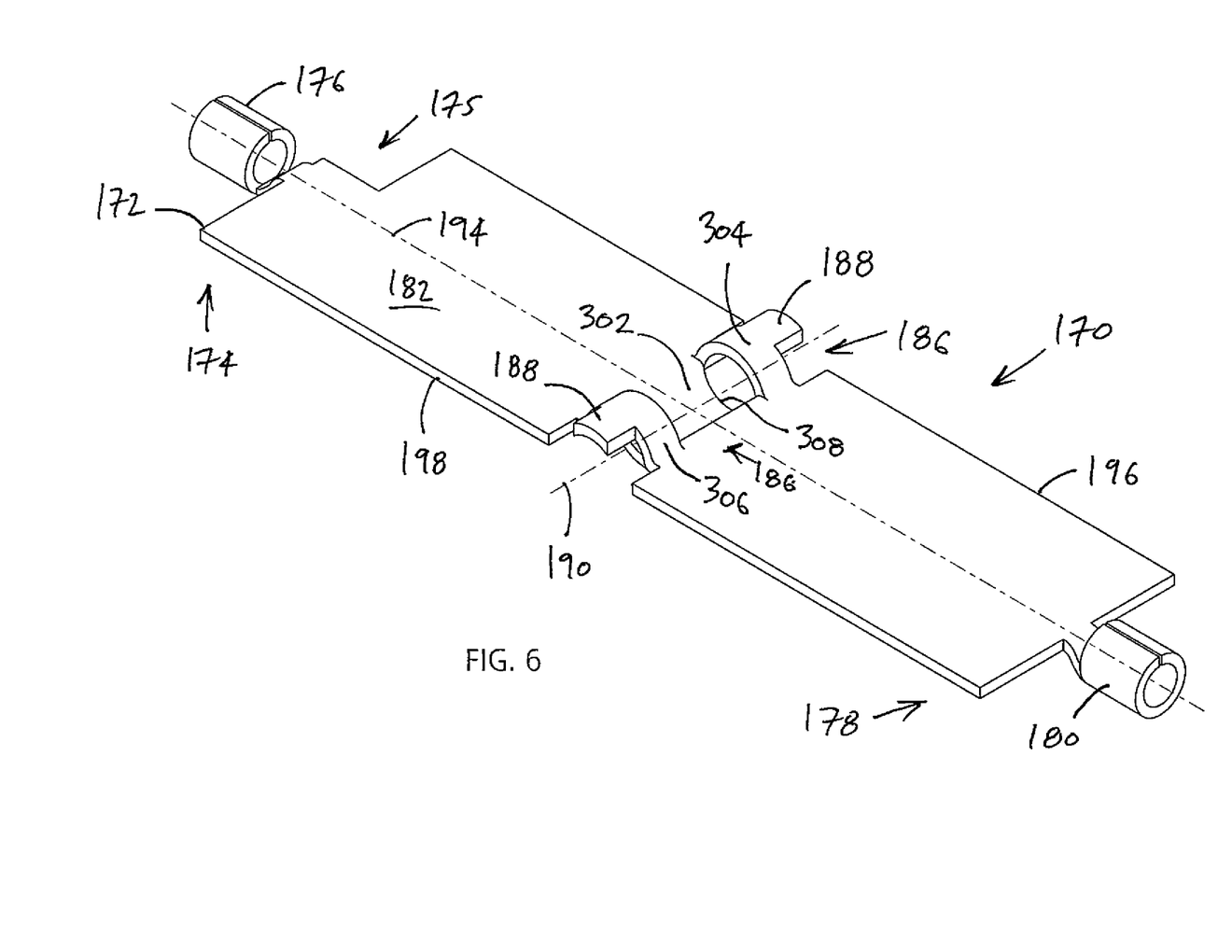
FIG. 6. is a perspective view of a flag.
Figure 7:
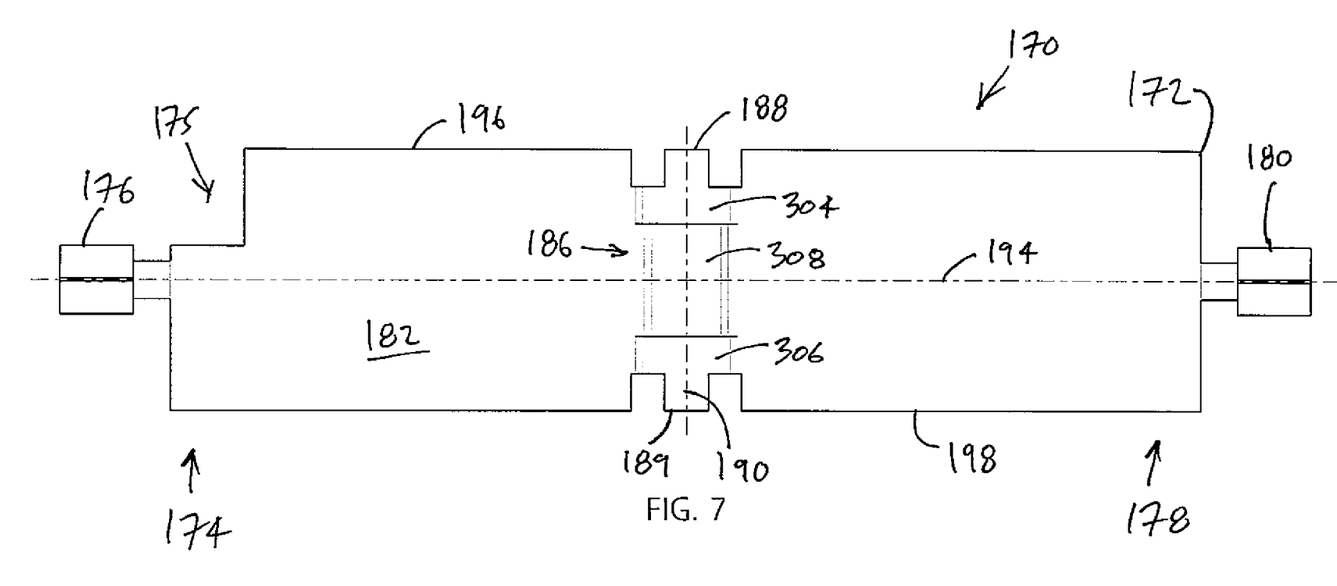
FIG. 7 is a plan view of the flag.
Figure 8:
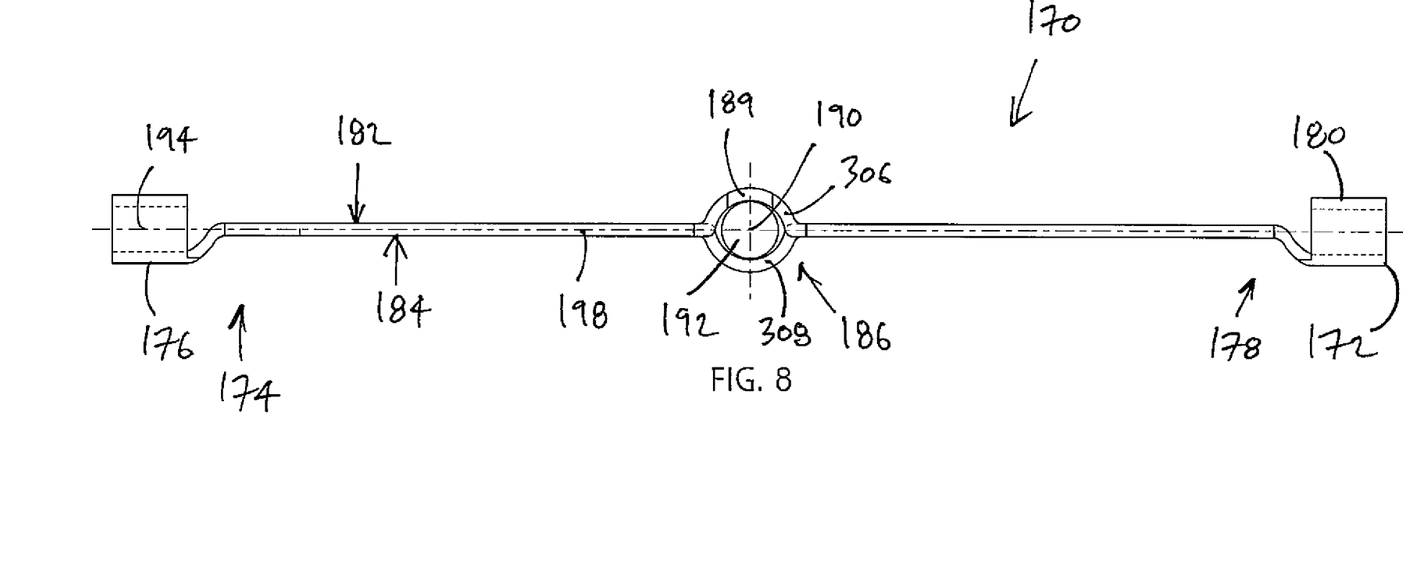
FIG. 8 is an elevation view of a flag.

Referring to FIGS. 6-8, each flag 170 includes a generally planar elongated body 172 extending between a first end 174 and a second end 178 along a central axis 194, and between opposing first and second edges 196, 198 on either side of the central axis 194. The first end 174 forms a first pin 176 from the body 172, and the second end 178 forms a second pin 180 from the body 172. In an embodiment, the pins 176, 178 are formed by rolling tabs formed at the ends of the body 172 about a central axis 194 extending the length of the body 172 between the first end 174 and second end 178. The first end 174 also includes a notch 175 formed between the first edge 196 and first pin 176. The body 172 presents a first face 182 extending between the first and second ends 174, 178, and first and second edges 196, 198, and an opposite second face 184 extending between the first and second ends 174, 178, and first and second edges 196, 198. The body 172 forms a central pocket 186 about a midline 190 extending between the first and second edges 196, 198 located between the first and second 174, 178 ends. In an embodiment, the pocket 186 is a tubular cavity extending along the midline 190 between the first and second edges 196, 198, and forms an interior wall 302 with an upper and lower crescent-shaped portion 304, 306 extending from the first face 182, and a middle crescent-shaped portion 308 disposed between the upper and lower portion extending from the second face 184. A first tab 188 at the upper portion is formed at the first edge 196 by removing a portion of the body 172 on either side of the midline 190, and a second tab 189 at the lower portion is formed at the second edge 198 by removing a portion of the body 172 on either side of the midline 190. A magnet 192 is disposed within the pocket 186 and secured therein by bending tabs 188, 189 toward the adjacent open end of the pocket 186. The flag 170 is manufactured from a nonmetallic material, including aluminum. In an embodiment, the first face 182 is colored red, and the second face 184 is colored white. The magnet 192 interacts with magnet 140 causing the flags 170 to rotate up and down in the frame 152 as the float 136 moves behind.

Figure 5:
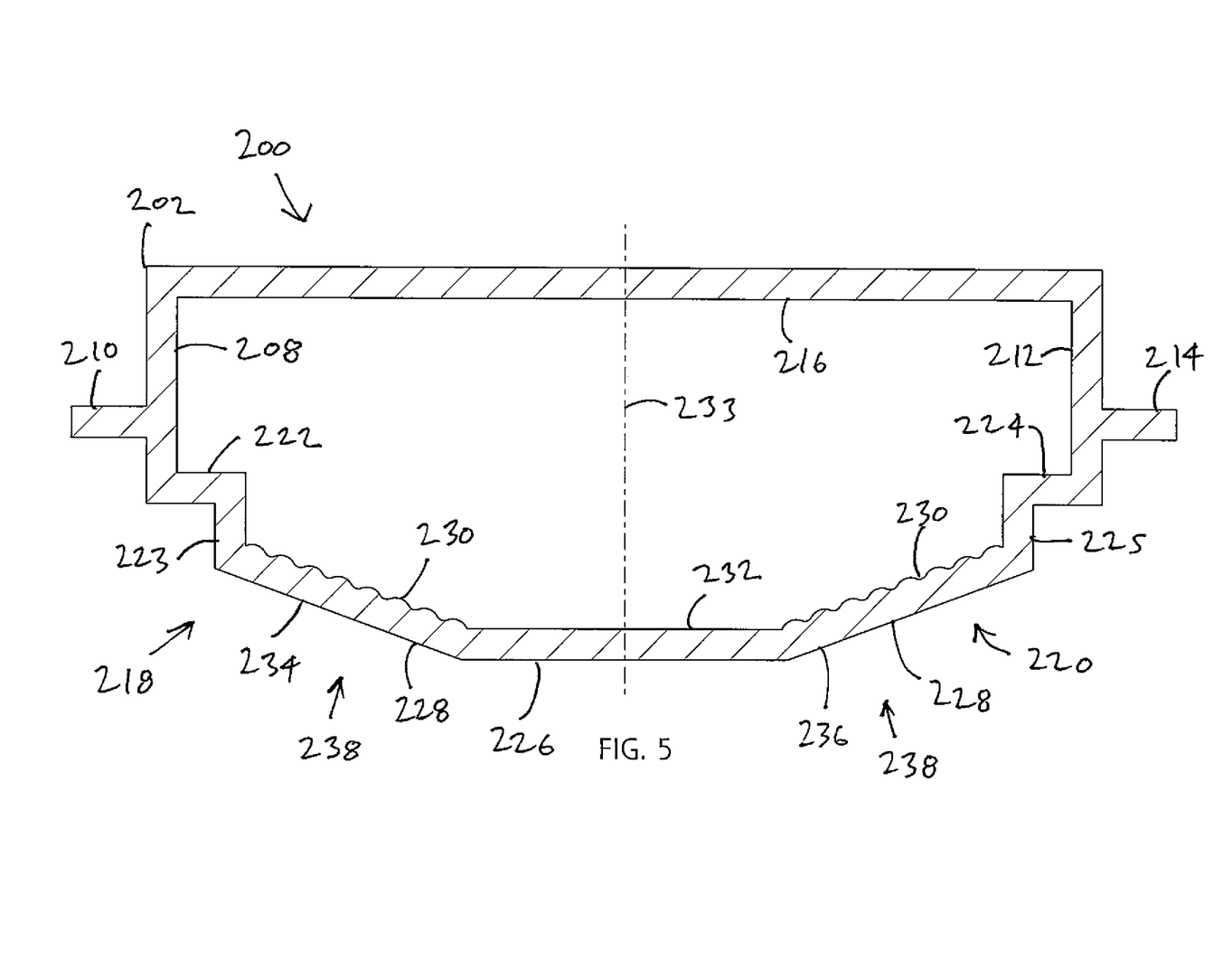
FIG. 5 is a top plan cross sectional view of the lens assembly.

Referring to FIGS. 3-5, the lens assembly 200 has an elongated hollow tubular body 202 extending longitudinally between a top end and a bottom end, and extending laterally between a left side 208 and a right side 212 allowing a user to see the flags 170 therein. In an embodiment, the lens assembly 200 is manufactured from clear polycarbonate. In an embodiment, the lens assembly 200 is formed by extrusion. The body 202 forms a rear wall 216 and opposing front face 218 separated by opposing left and right walls 222, 224. A tab 210 extends laterally outward from the left side 208, and a tab 214 extends laterally outward from the right side 212 allowing the lens assembly 200 to be mounted within a frame 116. A centerline 233 extends perpendicular through the center of the rear wall 216 and front face 218.

The front face 218 includes lens elements forward of the tabs 210, 214. A left wall 222 extends laterally inward from the left end 208 toward the centerline 233 terminating at a left sidewall 223, and a right wall 224 extends laterally inward from the right end 212 toward the centerline 233 terminating at a right sidewall 225. The left sidewall 223 extends away from the rear wall 216 terminating at a left lateral 234, and the right sidewall 225 extends away from the rear wall 216 terminating at a right lateral 236. The left and right laterals 234, 236 extend forward from the rear wall 216, and inward toward opposite sides of a center pane 232. The center pane 232 is bisected by the centerline 233 centered between the left and right ends 208, 212, and presents an outer face extending laterally between the left lateral 234 and right lateral 236. The left lateral 234 extends rearward from the center pane 232 terminating at the left sidewall 223 at an angle of approximately 20 degrees with respect to the outer face of the center pane 232, and the right lateral 236 extends rearward from the center pane 232 terminating at the right sidewall 225 at an angle of approximately 20 degrees with respect to the outer face of the center pane 232. The laterals 234, 236 have an exterior surface 228, and an interior surface 230. The exterior surface 228 presents a planar surface. The interior surface 230 forms a plurality of columns of convex lenses, cells, or lenticules extending between the top end and the bottom end, wherein each lateral 234, 236 forms a lenticular lens 238 allowing the flags 170 to be viewed from the left and right side of the assembly 100 by a user at an angle between about 0 degrees to about 110 degrees laterally from the centerline 233.

In an embodiment, the pitch, or width of each lenticular cell is about 0.06 inches.

The flag assembly 150 is positioned within the lens assembly 200, whereby the rear portion 154 is adjacent the rear wall 216, the left side 160 is adjacent the left side 208, the right side 164 is adjacent the right side 212, the left side 160 is positioned behind the left wall 222, the right side 164 is positioned behind the right wall 224, and the flags 170 are visible through the front face 218.

The frame 116 extends longitudinally between a top end and a bottom end, and forms a back plate 120 with opposing left and right channel members 118, 119. The channel members include an inwardly open groove 121 running between the top end and bottom end. The left channel member 118 groove 121 receives tab 210, and the right channel member 119 groove 121 receives tab 214.

In use, the flags 170 freely rotate about their pins 176, 180 within the frame 152 as the float 136 with the magnet 140 travels up and down within the vessel 134 behind the flag assembly 150. The flags 170 rotate between a first position with the first face 182 visible through the front face 218, and a second position with the second face 184 visible through the front face 218. When a flag 170 is in the first position, the notch 175 is facing upward, and the first end 174 overlaps the stop 162 preventing the first edge 196 from moving forward, away from the rear portion 154. As the float 136 travels downward in the vessel 134 the magnet 140 interacts with the magnet 192 in each flag 170, rotating the flags 170 about the pins 176, 180 moving the second edge 198 upward and the first edge 196 downward exposing second face 184. When the flag 170 is in the second position, the notch 175 is facing downward, and the first end 174 overlaps the stop 162 preventing the second edge 198 from moving rearward toward the rear portion 154. A faceplate 132 adjacent the lens assembly 200 includes graduated markings indicating the level of fluid 142 within the process chamber 144. As the float 136 travels upward in the vessel 134 the magnet 140 interacts with the magnet 192 in each flag 170 rotating the flags 170 from the second position to the first position. Accordingly, the flags 170 below the location of the float 136 are one color, and the flags 170 above the location of the float 136 are another color providing a visual indication to a user of the level of fluid 142 in the process chamber 144 without exposing the fluid 142 to the outside atmosphere or requiring direct visual sight of the fluid 142 in the process chamber 144.

The frame 116 extends longitudinally between a top end and a bottom end, and forms a back plate 120 with opposing left and right channel members 118, 119. The channel members include a groove 121 running between the top end and bottom end. The left channel member 118 groove 121 receives tab 210, and the right channel member 119 groove 121 receives tab 214.

High temperature fluids 142, such as liquids used in boiler feed water heater systems, can affect the performance and accuracy of float operated fluid level gauges. The assembly 100 includes features that allow the device to operate in high temperature applications. The channel members 118, 119 position the lens assembly 200 whereby the back wall 216 is spaced apart from the back plate 120 forming a channel 124 allowing air to pass in between, thereby minimizing heat transfer from the fluid 142 to the lens assembly 200 and flag assembly 150. The back plate 120 is set off from the vessel 134 by spacers 126 forming a gap 128. The gap 128 further isolates the lens assembly 200 and flag assembly 150 from the fluid 142, and distances the frame from the fluid 142. In an embodiment, the spacers 126 do not transfer heat between the vessel 134 and the visual indicator assembly 100. In an embodiment, the spacers 126 are ceramic pocket washers. The frame 116 is secured to the vessel 134 by fasteners 130, including straps. In an embodiment, the fasteners 130 are manufactured from stainless steel, a poor conductor of heat, thereby minimizing the amount of heat transferred to the indicator assembly 100.

Various features of the lens assembly 200 and flags 170 provide enhanced visibility of the level indication. The lens assembly 200 is mounted in the frame 116 whereby the face of each flag 170 projects outward beyond the face of the left channel member 118 and right channel member 119 (FIG. 4). The projection of the flags 170 combined with the projection of the front lens 220 beyond the face of the channel members 118, 119 allow the flags 170 to be viewed from the side of the visual indicator assembly 100, thereby allowing an observer to determine the level of the fluid 142 in the process chamber 144 from a wide variety of viewing angles. In addition, the use of lenticular lenses in the left and right laterals 234, 236 allow the fluid level to be viewed from a full 220 degree angle.

It will be appreciated that the visual indicator assembly 100 can be used for various other applications. Moreover, the visual indicator assembly 100 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A level gauge, comprising:
    a lens assembly, comprising:
        an elongated tubular body extending from a top end to a bottom end, having an interior surface and exterior surface, the lens assembly comprising:
        a rear wall; and
        a front face, comprising:
            a center pane aligned on a centerline extending perpendicular from the center of the rear wall;
            a left lateral extending rearward from the center pane toward a left wall;
            a right lateral extending rearward from the center pane toward a right wall; and
            wherein each of the left lateral and right lateral form a lenticular lens.

2. The lens assembly of claim 1, further comprising:
    a flag assembly comprising a plurality of flags disposed within the lens assembly; and
    wherein the flags are visible through the front face at the exterior of the lens assembly.

3. The lens assembly of claim 2, wherein the flags are visible through the front face at an angle between about 0 degrees to about 110 degrees from the centerline.

4. The flag assembly of claim 2, wherein the flag comprises:
    a body extending between a first end and a second end, and a first edge and an opposite second edge, the body presenting a first face and a second face;
    a central pocket formed from the body and extending between the first edge and the second edge, the central pocket further comprising:
        a central crescent-shaped member extending from the second face;
        an upper crescent-shaped member, adjacent the central crescent-shaped member, extending from the first face; and
        a lower crescent-shaped member, adjacent the central crescent-shaped member opposite the upper crescent-shaped member, extending from the first face.

5. The flag of claim 4, further comprising:
    a first tab formed from the upper crescent-shaped member;
    a second tab formed from the lower crescent-shaped member; and
    wherein the first and second tabs retain a magnet within the central pocket.

6. The lens assembly of claim 1, wherein the left lateral extends rearward from the center pane at approximately 20 degrees with respect to the outer surface of the center pane, and the right lateral extends rearward from the center pane at approximately 20 degrees with respect to the outer surface of the center pane.

7. A level gauge, comprising:
    a lens assembly, comprising:
        an elongated tubular body extending from a top end to a bottom end, and having an interior surface and exterior surface, the body comprising:
        a rear wall;
        a left wall extending forward from the rear wall;
        a right wall, opposite the left wall, extending forward from the rear wall; and
        a front face disposed opposite the rear wall, the front face comprising:

a center pane opposite the rear wall and aligned on a centerline extending perpendicular from the center of the rear wall;
a left lateral extending rearward from the center pane toward the left wall;
a right lateral extending rearward from the center pane toward the right wall; and
wherein the left lateral interior surface forms a plurality of adjacent lenticules extending between the top end and the bottom end, and the right lateral interior surface form a plurality of adjacent lenticules extending between the top end and the bottom end;
a flag assembly comprising an elongated frame with a plurality of rotatable flags; and
wherein the flag assembly is disposed within the lens assembly whereby the flags are visible through the front face from the exterior of the lens assembly.

8. The level gauge of claim 7, wherein the flags are visible through the front face at an angle between about 0 degrees to about 110 degrees from the centerline.

9. The level gauge of claim 7, wherein the flag comprises:
a body extending between a first end and an opposite second end, and a first edge and an opposite second edge, the body presenting a first face and a second face;
a central pocket formed from the body and extending between the first edge and the second edge, the central pocket further comprising:
a central crescent-shaped member extending from the second face;
an upper crescent-shaped member, adjacent the central crescent-shaped member, extending from the first face; and
a lower crescent-shaped member, adjacent the central crescent-shaped member and opposite the upper crescent-shaped member, extending from the first face.

10. The level gauge of claim 9, further comprising:
a first tab formed from the upper crescent-shaped member;
a second tab formed from the lower crescent-shaped member; and
wherein the first and second tabs retain a magnet within the central pocket.

11. The level gauge of claim 9, further comprising:
a first pin formed at the first end;
a second pin formed at the second end; and
wherein the pins are rotatably received within the frame.

12. The level gauge of claim 7, wherein the left lateral extends rearward from the center pane at approximately 20 degrees with respect to the outer surface of the center pane, and the right lateral extends rearward from the center pane at approximately 20 degrees with respect to the outer surface of the center pane.

13. The level gauge of claim 7, further comprising:
a frame with a back plate; and
wherein the lens assembly is mounted in the frame whereby a channel separates the lens rear wall and the back plate.

14. The level gauge of claim 13, wherein the frame is mounted to a vessel whereby a gap separates the back plate and the vessel.

15. The level gauge of claim 14, wherein the gap is formed by a spacer in contact with the back plate and the vessel.

16. The level gauge of claim 13, further comprising:
a tab extending laterally outward from the lens left wall;
a tab extending laterally outward from the lens right wall; and
wherein the frame forms left and right channel members extending from the back plate, wherein the channel members form opposing grooves for receiving the lens tabs.

* * * * *